(12) United States Patent
Bergum et al.

(10) Patent No.: US 8,193,943 B2
(45) Date of Patent: Jun. 5, 2012

(54) HANDHELD CHARGE INDICATOR ASSEMBLIES FOR CHILDREN'S RIDE-ON VEHICLES, AND ASSOCIATED KITS AND METHODS

(75) Inventors: Mark J. Bergum, Clarence, NY (US); Timothy J. Snyder, Elma, NY (US)

(73) Assignee: Mattel, Inc., El Segundo, CA (US)

( * ) Notice: Subject to any disclaimer, the term of this patent is extended or adjusted under 35 U.S.C. 154(b) by 330 days.

(21) Appl. No.: 12/577,359

(22) Filed: Oct. 12, 2009

(65) Prior Publication Data

US 2011/0084819 A1   Apr. 14, 2011

(51) Int. Cl.
  *G08B 21/00* (2006.01)
(52) U.S. Cl. ............... 340/636.15; 180/65.1; 340/425.5; 340/636.1
(58) Field of Classification Search ........... 340/636.1, 340/636.15, 425.5; 180/65.1
See application file for complete search history.

(56) References Cited

U.S. PATENT DOCUMENTS

| | | |
|---|---|---|
| 945,564 A | 1/1910 | Marko |
| 964,995 A | 7/1910 | Marko |
| 2,609,409 A | 9/1952 | Radeke |
| 2,672,499 A | 3/1954 | Radeke |
| 2,991,413 A | 7/1961 | Taylor |
| 3,061,827 A | 10/1962 | Timbers |
| 3,065,827 A | 11/1962 | Timbers |
| 3,118,137 A | 1/1964 | Vincent |
| 3,383,580 A | 5/1968 | Wallace, Jr. |
| 3,392,328 A | 7/1968 | Figg |
| 3,401,337 A | 9/1968 | Beusman et al. |
| 3,408,973 A | 11/1968 | Curtis et al. |
| 3,593,099 A | 7/1971 | Scholl |
| 3,600,234 A | 8/1971 | Massie, Jr. |
| 3,818,325 A | 6/1974 | Boshers |
| 3,974,441 A | 8/1976 | Van Den Haak |

(Continued)

FOREIGN PATENT DOCUMENTS

DE   2742675 A1   4/1979

(Continued)

OTHER PUBLICATIONS

English-language abstract of German Patent No. DE 2742675A1, WPI / Thomson, Nov. 24, 2010.

(Continued)

*Primary Examiner* — Thomas Mullen
(74) *Attorney, Agent, or Firm* — Dascenzo Intellectual Property Law, P.C.

(57) ABSTRACT

Handheld charge indicator assemblies, children's ride-on vehicle kits including the same, and methods of determining the state of charge of a battery assembly of a children's ride-on vehicle. Handheld charge indicator assemblies are sized to be held in the hand of a user and are configured to be selectively interconnected to a battery assembly of a children's ride-on vehicle and output an output signal representative of a voltage of the battery assembly. Handheld charge indicator assemblies include a body, an electronic circuit housed within the body, an indicator configured to output an output signal representative of an input voltage to the electronic circuit, and a battery connector configured to engage the battery assembly of a children's ride-on vehicle. In some embodiments, the handheld charge indicator assembly further includes an actuator configured to actuate the electronic circuit to detect the input voltage responsive to a user engaging the actuator.

19 Claims, 6 Drawing Sheets

U.S. PATENT DOCUMENTS

| | | | |
|---|---|---|---|
| 4,134,060 A | | 1/1979 | Feldman |
| 4,137,493 A | | 1/1979 | Smith |
| 4,237,198 A | | 12/1980 | Eby et al. |
| 4,289,836 A | | 9/1981 | Lemelson |
| 4,625,175 A | | 11/1986 | Smith |
| 4,636,178 A | | 1/1987 | Oda |
| 4,692,680 A | | 9/1987 | Sherer |
| 5,130,659 A | | 7/1992 | Sloan |
| 5,159,272 A | | 10/1992 | Rao et al. |
| 5,434,494 A | | 7/1995 | Perego |
| 5,496,658 A | | 3/1996 | Hein et al. |
| 5,519,383 A | | 5/1996 | De La Rosa |
| 5,656,907 A | * | 8/1997 | Chainani et al. ............... 318/587 |
| 5,656,919 A | | 8/1997 | Procter et al. |
| 5,685,734 A | | 11/1997 | Kutz |
| 5,895,440 A | | 4/1999 | Proctor et al. |
| 5,933,010 A | | 8/1999 | Moreno |
| 5,934,694 A | | 8/1999 | Schugt et al. |
| 5,937,622 A | | 8/1999 | Carrier et al. |
| 5,963,013 A | | 10/1999 | Watson et al. |
| 6,222,370 B1 | | 4/2001 | Schousek et al. |
| 6,276,975 B1 | | 8/2001 | Knight |
| 6,323,650 B1 | | 11/2001 | Bertness et al. |
| 6,509,719 B2 | | 1/2003 | Crofut et al. |
| 6,542,077 B2 | | 4/2003 | Joao |
| 6,633,165 B2 | | 10/2003 | Bertness |
| 6,707,303 B2 | | 3/2004 | Bertness et al. |
| 6,850,037 B2 | | 2/2005 | Bertness |
| 7,012,515 B2 | | 3/2006 | Yamamoto et al. |
| 7,019,492 B1 | | 3/2006 | Baker et al. |
| 7,235,977 B2 | * | 6/2007 | Koran et al. .................. 324/426 |
| 7,513,324 B2 | | 4/2009 | Bergum et al. |
| 2004/0046673 A1 | | 3/2004 | Kovarik et al. |
| 2007/0045013 A1 | | 3/2007 | Bergum et al. |
| 2007/0175678 A1 | | 8/2007 | Bae |

FOREIGN PATENT DOCUMENTS

| | | |
|---|---|---|
| GB | 2116728 A | 9/1983 |

OTHER PUBLICATIONS

International Search Report, U.S. Patent and Trademark Office, 2 pages, Aug. 29, 2008.

Written Opinion, U.S. Patent and Trademark Office, 3 pages, Aug. 29, 2008.

* cited by examiner

HANDHELD CHARGE INDICATOR ASSEMBLIES FOR CHILDREN'S RIDE-ON VEHICLES, AND ASSOCIATED KITS AND METHODS

TECHNICAL FIELD

The present disclosure relates generally to children's ride-on vehicles, and more particularly to handheld charge indicator assemblies for use with battery-powered children's ride-on vehicles.

BACKGROUND OF THE DISCLOSURE

Children's ride-on vehicles are reduced-scale vehicles that are designed for use by children. For example, children's ride-on vehicles include a seat adapted to accommodate one or more children and steering and drive assemblies that are adapted to be operated by a child sitting on the seat. One type of drive assembly that is often used in children's ride-on vehicles includes a battery-powered motor assembly that is adapted to drive the rotation of one or more of the vehicle's wheels. The motor assembly is powered by a battery assembly, which may include one or more rechargeable batteries. Typically, the vehicle will include an actuator, such as a foot pedal, push button or other user input device, which enables a child to select when power is delivered to the motor assembly. Some drive assemblies further include other user input devices, such as a speed selector and/or a direction selector, which are operated by a child sitting on the vehicle's seat to select the speed and direction at which the vehicle travels.

The rechargeable battery of a children's ride-on vehicle is typically installed in a battery compartment of the vehicle when in use, and may be removable for storage or recharging. Typically, the rechargeable battery is selectively charged by disconnecting the battery from the ride-on's drive assembly and connecting the battery to a charging unit, which typically includes an AC adapter and a suitable charging plug, probe, or other connector that is adapted to interconnect with the rechargeable battery. A ride-on vehicle may be operated continuously for several hours on a fully charged battery. However, conventional ride-ons lack a mechanism for providing an indication of the state of charge of the battery assembly.

SUMMARY OF THE DISCLOSURE

Handheld charge indicator assemblies according to the present disclosure are designed to be used with children's ride-on vehicles having battery assemblies. Handheld charge indicator assemblies according to the present disclosure are sized to be held in the hand of a user and are configured to be selectively interconnected to the battery assembly of a children's ride-on vehicle and to output an output signal representative of a voltage of the battery assembly, thereby communicating to a user the state of charge of the battery assembly. Handheld charge indicator assemblies include a body, an electronic circuit housed within the body, an indicator configured to output an output signal representative of an input voltage to the electronic circuit, and a battery connector configured to engage the battery assembly of a children's ride-on vehicle. In some embodiments, the handheld charge indicator further includes an actuator configured to actuate the electronic circuit to detect the input voltage responsive to a user engaging the actuator. In some embodiments, the indicator includes an audible indicator. In some embodiments, the indicator includes a visual indicator. In some embodiments, the indicator is configured to output a plurality of outputs, with each output representative of a discrete range of the input voltage corresponding to the charge state of the battery assembly.

Handheld charge indicator assemblies in combination with children's ride-on vehicles, children's ride-on vehicle kits that include handheld charge indicator assemblies, and methods of determining the state of charge of a battery assembly of a children's ride-on vehicle (e.g., using a handheld charge indicator assembly according to the present disclosure) are also disclosed herein.

DETAILED DESCRIPTION AND BEST MODE OF THE DISCLOSURE

Figure 1:
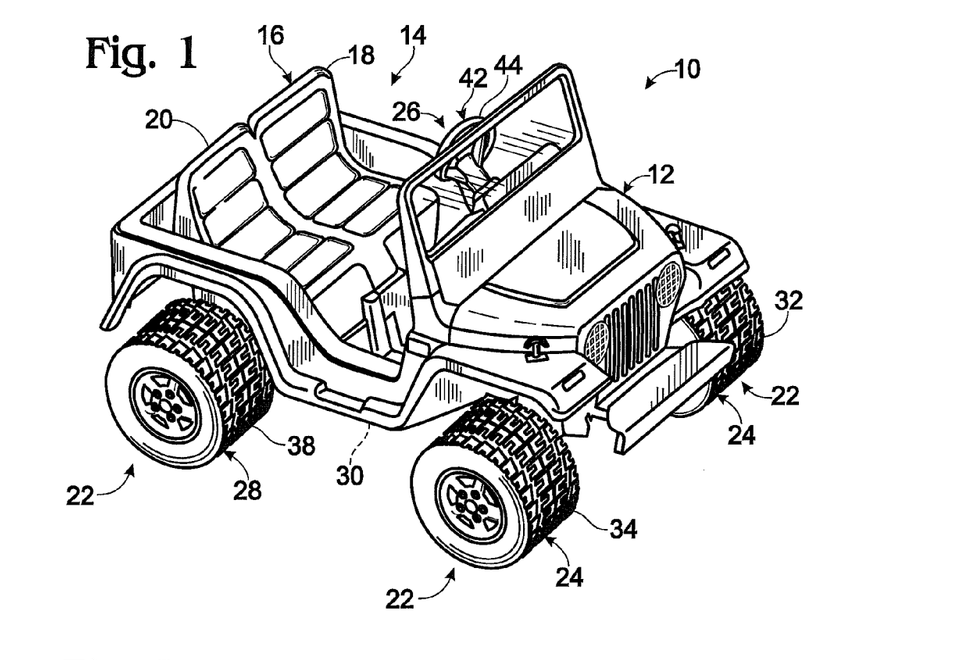
FIG. 1 is a perspective view of an illustrative, non-exclusive example of a children's ride-on vehicle according to the present disclosure.

An illustrative, non-exclusive example of a children's ride-on vehicle according to the present disclosure is shown in FIG. 1 and indicated generally at 10. Children's ride-on vehicles may additionally or alternatively be referred to herein as ride-on vehicles, ride-ons, and/or vehicles. Ride-on vehicle 10 includes a support frame, or body, 12 that provides a riding space, or passenger compartment, 14 with a seat assembly 16 that is sized and configured to accommodate at least one child, including a child driver. Seat assembly 16 may be integral with or otherwise mounted on body 12 and may have any suitable configuration, including configurations in which the position of the seat assembly is adjustable within the passenger compartment, and configurations in which the seat assembly includes two or more seats or two or more seating regions. Typically, vehicle 10 will be sized for use by a child driver or by a child driver and a child passenger. For example, in the illustrated embodiment, seat assembly 16 includes a pair of seats, or seating regions, 18 and 20, with seat 18 sized and positioned to receive a child driver and seat 20 sized and positioned to receive a child passenger.

Body 12 typically is formed from molded plastic and may be integrally formed or formed from a plurality of parts that are secured together by screws, bolts, clips or other suitable fasteners. Body 12 may additionally or alternatively be at least partially formed from other suitable material(s), such as metal, wood, or composite materials. Body 12 may include an underlying frame on which a chassis is mounted. In such an embodiment, the frame is often formed of metal and/or molded plastic, with the chassis typically formed of molded plastic.

As shown, body 12 is shaped to generally resemble a reduced-scale JEEP® vehicle. JEEP is a registered trademark of the Chrysler Group LLC, and the JEEP mark and designs are used by permission. Children's ride-on vehicles according to the present disclosure may be shaped to generally resemble any type of vehicle. Examples of suitable vehicles are reduced-scale, or child-sized, vehicles that are shaped to resemble corresponding full-sized, or adult-sized, vehicles, such as cars, trucks, construction vehicles, emergency vehicles, off-road vehicles, motorcycles, space vehicles, aircraft, watercraft and the like. However, it is also within the scope of the present disclosure that vehicle 10 may be shaped to resemble fantasy vehicles that do not have a corresponding adult-sized counterpart. Although vehicle 10 is depicted in the form of a reduced-scale JEEP® vehicle, it will be appreciated that the components and/or features of vehicle 10, including the subsequently described handheld charge indicator assemblies, may be configured for use on and/or with any type of children's ride-on vehicle having one or more powered components.

Figure 2:
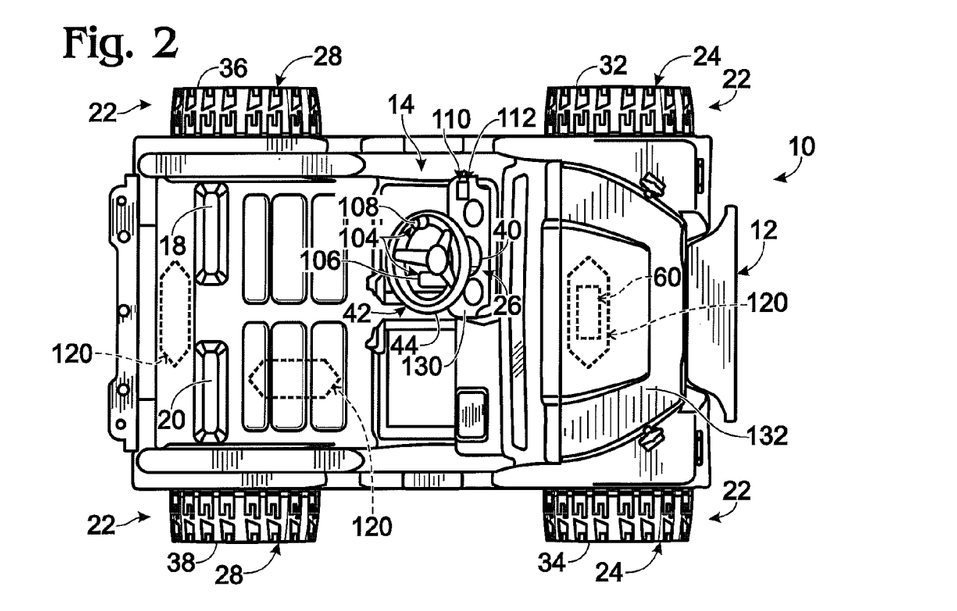
FIG. 2 is a top plan view of the children's ride-on vehicle of FIG. 1.

Body 12 also includes a plurality of wheels 22 that are rotatably coupled to body 12, as indicated in FIGS. 1-2. The plurality of wheels includes a steerable wheel assembly 24 that contains at least one steerable wheel that is adapted to be steered by the vehicle's steering assembly 26, typically at least partially in response to user-imparted steering inputs thereto. The plurality of wheels further includes a driven wheel assembly 28 that contains at least one driven wheel that is adapted to be rotationally driven by the vehicle's drive assembly 30. As used herein, the term "driven wheel" refers to a wheel that is rotated directly in response to a rotational input from the vehicle's drive assembly, which is either directly conveyed to the wheel by the output of the motor assembly, or conveyed through a linkage, such as a gearbox, belt, chain, gear assembly, axle, or the like. In the illustrated embodiment, vehicle 10 includes four wheels 22, with front wheels 32 and 34 forming steerable wheel assembly 24, and rear wheels 36 and 38 forming driven wheel assembly 28. The number of wheels on the vehicle may vary from two wheels to three, four, six, or more wheels, although children's ride-on vehicles typically include at least three wheels for stability. Similarly, each wheel assembly must contain at least one wheel, and a particular wheel may form all or a portion of both the steerable wheel assembly and the driven wheel assembly. For example, it is within the scope of the disclosure that either or both of front wheels 32 and 34 or rear wheels 36 and 38 are driven and steerable wheels. Similarly, one front wheel and one rear wheel may be driven and/or steerable, or the vehicle may include one or more driven or steerable wheels underneath its body that are generally hidden by the body of the vehicle.

A portion of the vehicle's steering assembly 26 is shown in FIGS. 1-2 and includes a steering column 40 (indicated in FIG. 2) and a steering mechanism 42. The steering assembly enables a child sitting on seat 18 to steer the vehicle's steerable wheel assembly 24 via user-applied steering inputs to steering mechanism 42, which is positioned on vehicle 10 for operation by a child sitting on seat 18. In the illustrated embodiment, steering mechanism 42 takes the form of a steering wheel 44. Other suitable structures, such as handlebars and steering levers, may be used and are within the scope of the present disclosure. Steering column 40 includes any suitable mechanical linkage that conveys a child's steering inputs from the steering mechanism to the vehicle's steerable wheel assembly, thereby steering the vehicle.

Figure 3:
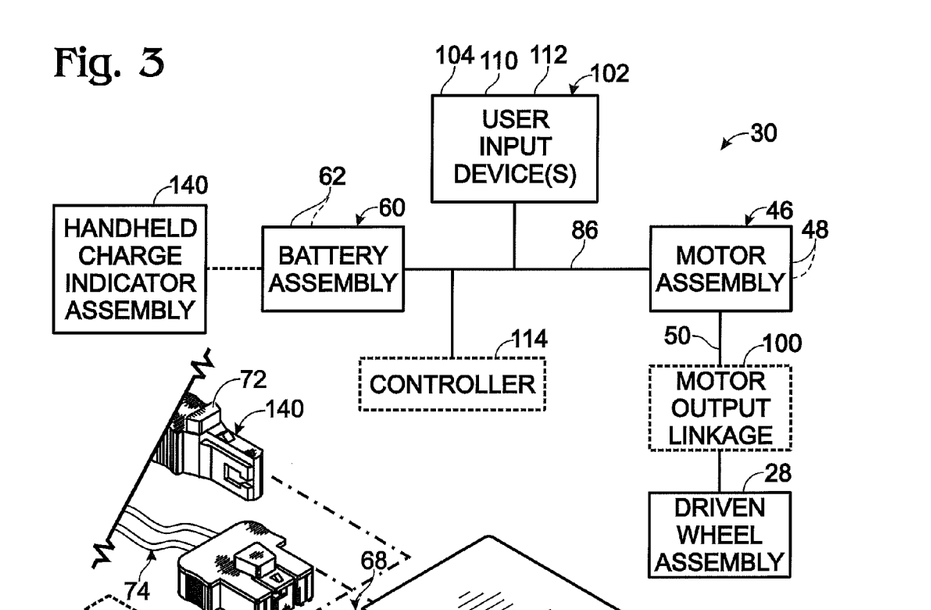
FIG. 3 is a schematic diagram of an illustrative, non-exclusive example of a suitable drive assembly for children's ride-on vehicles according to the present disclosure, schematically shown together with a handheld charge indicator assembly according to the present disclosure.

In FIG. 3, an example of a suitable drive assembly 30 for a children's ride-on vehicle, such as vehicle 10, is schematically illustrated together with a handheld charge indicator assembly 140 according to the present disclosure. Drive assembly 30 is adapted to drive the rotation of driven wheel assembly 28. The drive assembly includes a motor assembly 46, which includes at least one electric motor 48 that is adapted to drive the rotation of at least one of the driven wheels of the plurality of wheels. The motor assembly includes an output 50 that provides a rotational input to the driven wheel assembly. Typically, the output 50 from each of the one or more motors includes a rotating shaft and/or a rotation pinion or output gear. Output 50 may include more than one shaft, pinion, and/or gear, such as when motor assembly 46 includes more than one motor and/or when driven wheel assembly 28 includes more than one driven wheel. Motor assembly 46 may also be configured to power other moveable components on vehicle 10, such as depending on the form of the vehicle. For example, the motor assembly may be coupled to raise and lower the blade of a ride-on that resembles a bulldozer, the bucket of a ride-on that resembles a skid-steer or other loader, the bed of a ride-on that resembles a dump truck, etc.

Figure 4:
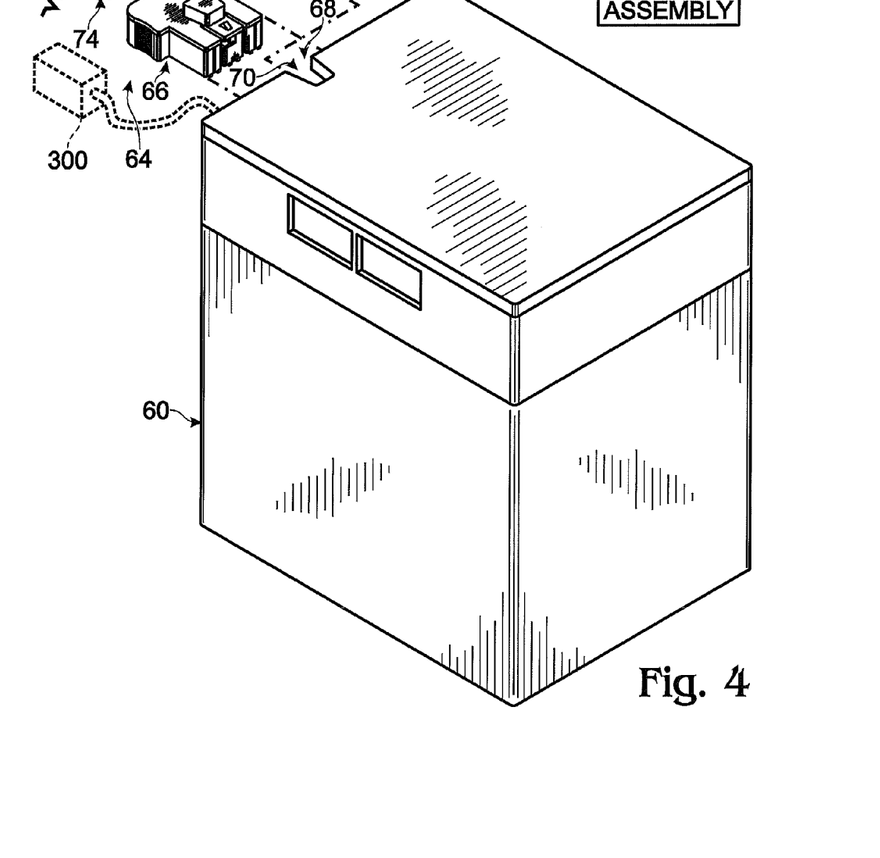
FIG. 4 is a perspective view of an illustrative, non-exclusive example of a battery assembly of a children's ride-on vehicle, shown together with portions of a battery connector of a handheld charge indicator assembly according to the present disclosure, and a portion of a wiring harness of a children's ride-on vehicle.

Power for the motor assembly is provided by any suitable power source. An illustrative, non-exclusive example of a suitable power source is a battery assembly 60. Battery assembly 60 includes at least one battery 62 that is adapted to provide power to the motor assembly. Any suitable type and number of batteries may be used in battery assembly 60. Although not required, the batteries are typically rechargeable batteries. For example, one or more six-, twelve-, eighteen-, or twenty-four-volt batteries have proven effective. An illustrative, non-exclusive example of a battery assembly 60 is shown in FIG. 4. Also shown in FIG. 4 is an example of a connector assembly 64 that is adapted to transmit power from the battery assembly to the motor assembly by providing an electrical connection between the battery assembly and the motor assembly, typically through the vehicle's wiring harness. Thus, the motor assembly is operably connected to the battery assembly by any suitable electrical connectors, such as cables, wires, or positive and negative terminals or leads, and the like. In the example of a battery assembly shown generally in FIG. 4, connector assembly 64 includes a plug 66 that fits into a socket 68 that is electrically connected to the battery assembly. Socket 68 may additionally or alternatively be referred to as a motor connector. Plug 66 connects to an electrical cable 74 that transmits electrical power from the battery assembly to the motor assembly. Socket 68 may additionally or alternatively be configured to receive a probe 72 of a handheld charge indicator assembly 140 according to the present disclosure. In some such examples, the plug 66 may have to be disconnected from the socket 68 prior to a user selectively coupling the handheld charge indicator assembly to the battery assembly by inserting probe 72 into socket 68. Additionally or alternatively, battery assembly 60 may include a separate socket 70 that is configured to receive probe 72 of handheld charge indicator assembly 140. In some such examples, the motor assembly may not have to be disconnected from the battery assembly prior to a user selectively coupling the handheld charge indicator assembly to the battery assembly. Additionally or alternatively, one or more of socket 68 and socket 70 may (but are not required to) further be configured to receive a charging probe of a charging assembly, for example to recharge the battery assembly 60. Each of socket 68 and optional socket 70 may be referred to as an electrical connector of a battery assembly, and, when configured to be interconnected with a corresponding connector of a handheld charge indicator assembly according to the present disclosure, may be referred to as an indicator connector.

It is within the scope of the present disclosure that vehicle 10 may include any other suitable structure for conducting electrical power to and from the battery assembly, with the battery assembly of FIG. 4 merely providing an illustrative, non-exclusive example. For example, instead of the internal socket 68 depicted in FIG. 4, the battery assembly may include one or more batteries that include a connector that extends, typically via a wired connection, from the battery's housing. This construction is schematically illustrated in dashed lines at 300 in FIG. 4. Illustrative, non-exclusive examples of suitable batteries for children's ride-on vehicles are disclosed in U.S. Pat. No. 6,509,719, the complete disclosure of which is hereby incorporated by reference.

In FIG. 3, drive assembly 30 is shown further including an optional motor output linkage 100 that mechanically interconnects the motor assembly with the driven wheel assembly. Motor output linkage 100 is any suitable mechanism that transmits the rotational input from the motor assembly's output(s) to the driven wheel assembly. Illustrative, non-exclusive examples of suitable linkages 100 include an intermediate linkage between the output and the driven wheel assembly, such as a gearbox containing one or more gears, a belt or chain drive, a worm gear, one or more individual gears, and the like. The motor output linkage may be adapted to transmit the rotational input from the motor assembly to the driven wheel assembly at the same relative rate of rotation, or it may mechanically augment the rotational input to convey a greater or lesser rate of rotation relative to the rate of rotation of the output of the motor assembly. It is also within the scope of the disclosure that drive assembly 30 may be formed without motor output linkage 100, in which case the output(s) 50 of the motor assembly directly transmit the rotational input to the driven wheel assembly.

Drive assembly 30 also includes one or more user input devices 102 that are adapted to convey inputs from a child sitting on seat 18 to the drive assembly. User input devices 102 also may be referred to as user control devices. These devices convey a user's inputs via the vehicle's wiring harness 86, and affect the actuation of the motor assembly, such as by causing the actuation (or energization) of the motor assembly, selecting between a range of electronic configurations, selecting the direction of rotation of the motor assembly's output, selecting the relative degree of a maximum rate of rotation to which the motor assembly is actuated, etc. Illustrative, non-exclusive examples of suitable devices 102 include a drive actuator 104, through which a user input directing the battery assembly to energize the motor assembly is received. Illustrative, non-exclusive examples of suitable drive actuators 104 include an on/off switch, a foot pedal, a throttle lever, and a rotational handgrip on a steering mechanism that includes a handlebar. In FIG. 2, an example of a drive actuator 104 is shown in the form of a foot pedal 106 positioned for actuation by a child sitting on seat 18. When drive actuator 104 takes a form other than a foot pedal, it may be located in any suitable location within or near passenger compartment 14 so that a child sitting on seat 18 may reach the actuator while safely and suitably positioned to steer and/or otherwise operate the vehicle. For example, an on/off switch or throttle may be located on the body or on the steering mechanism, such as illustrated at 108 in FIG. 2.

Other illustrative, non-exclusive examples of user input devices 102 include a speed switch 110, which enables a user to select the relative rate of rotation of the motor assembly's output 50, and a direction switch 112, which enables a user to select the relative direction (i.e., clockwise or counterclockwise) of rotation of output 50 and thereby configure the vehicle to drive in forward and reverse directions. Switches 110 and 112 may be located in any suitable location on body 12 or steering assembly 26 for actuation by a child sitting on seat 18. An example of a suitable speed switch 110 is a switch that selectively configures a pair of batteries between series and parallel configurations to define relative "high" and "low" speed configurations. Speed switch 110 may additionally or alternatively selectively configure a pair of motors between series and parallel configurations. As a further example, the switches may convey inputs to a controller, such as subsequently described controller 114, which, responsive to inputs from the switches, configures the vehicle for a selected operating state.

Drive assembly 30 may (but is not required to) further include a controller 114, which is adapted to control electronically the transmission of the rotational input from the motor assembly to the driven wheel assembly. More specifically, controller 114 includes a microprocessor or suitable control circuit that is adapted to control the actuation, or energization, of the motor assembly by the battery assembly to regulate electronically the rotational input transmitted by the motor assembly to the driven wheel assembly. Controller 114 may regulate at least one of the timing and the ramp, or rate, of application of the transmission of the rotational input after actuation of a corresponding user input device by a child sitting on seat 18. In other words, the controller may regulate and/or delay in at least time and/or rate of transmission the rotational input to the driven wheel assembly responsive at least in part to a user input selecting the desired, or selected, rotational input. An illustrative, non-exclusive example of a suitable controller is disclosed in U.S. Pat. No. 6,771,034, the complete disclosure of which is hereby incorporated by reference.

As shown in FIG. 2, body 12 also includes a battery compartment 120 that is adapted to receive battery assembly 60. The battery compartment may take any of a variety of different shapes, sizes, and configurations depending on such factors as the form of vehicle 10, the portion of the vehicle's body within which the compartment is formed, and the size and shape of battery assembly 60. FIG. 2 provides graphical illustrations of several suitable positions for battery compartment 120.

Referring again to FIG. 3, a handheld charge indicator assembly 140 may be selectively and electrically coupled to battery assembly 60, for example, to assess an input voltage received by the handheld charge indicator assembly from the battery assembly, which typically comprises at least one rechargeable battery 62. The input voltage generally corresponds to the voltage output by battery assembly 60, and therefore indicates the relative state of charge of the battery assembly. Rechargeable batteries normally exhibit a characteristic no-load terminal voltage that generally indicates the level of capacity to which the rechargeable battery has been charged, or discharged.

For example, a 12-volt rechargeable battery may comprise six lead-acid cells connected in series, which, when fully charged, exhibit a no-load open circuit terminal voltage of greater than 13.0 volts. As this exemplary rechargeable battery is discharged, the no-load open circuit terminal voltage will generally decrease to a level below the nominal 12.0 volt rating of the battery. Manufacturers of rechargeable batteries typically define the charging level that corresponds to a rapid drop-off in no-load open circuit terminal voltage as a 0% charging level. For a typical 12-volt rechargeable battery as described herein, the no-load open circuit terminal voltage corresponding to the 0% charging level may be as low as 11.8 volts.

A children's ride-on vehicle 10 employing this 12-volt rechargeable battery in battery assembly 60 may exhibit negative play characteristics when the charging level approaches this 0% charging level. For example, the vehicle may not accelerate to a top, or even moderate, speed, may have difficulty climbing hills, traversing uneven terrain, etc. Handheld charge indicator assembly 140 is therefore provided to permit a child user, or the parent or other supervisor of a child user, of children's ride-on vehicle 10 to assess the no-load open-circuit terminal voltage of battery assembly 60. For example, the handheld charge indicator assembly may include a visual or audible output adapted to provide an indication of this voltage, such as within a plurality of pre-defined threshold voltage ranges.

Figure 5:
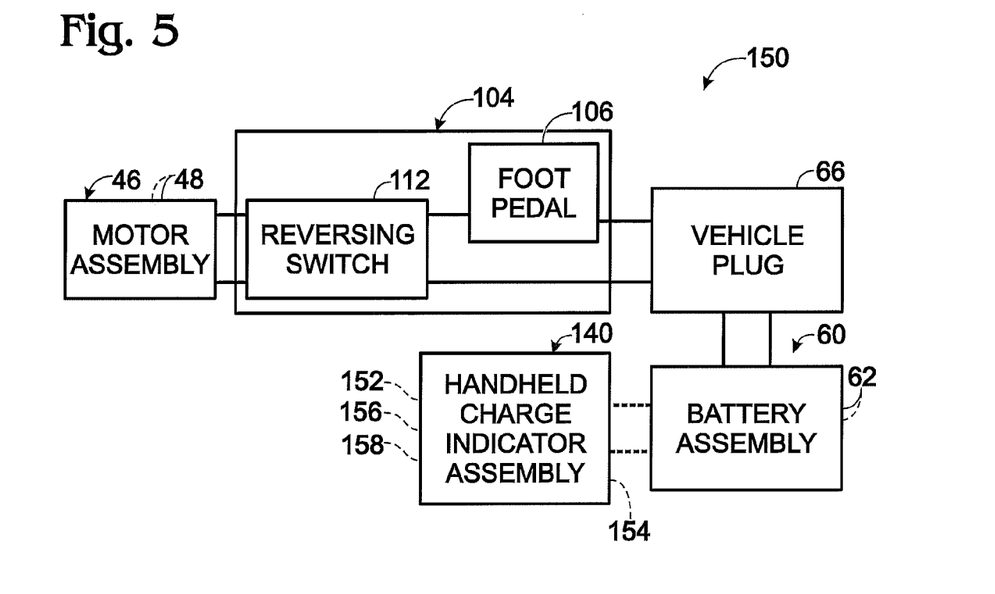
FIG. 5 is a schematic diagram of an illustrative, non-exclusive example of a suitable electrical system of a children's ride-on vehicle according to the present disclosure, schematically shown together with a handheld charge indicator assembly according to the present disclosure.

In FIG. 5, an illustrative, non-exclusive example of a suitable electrical system for vehicle 10 is shown at 150 and is schematically illustrated together with a handheld charge indicator assembly 140. As shown, electrical system 150 includes motor assembly 46, one or more drive actuators 104, vehicle plug 66, and battery assembly 60 that is selectively and electrically connectable to vehicle plug 66 and to handheld charge indicator assembly 140. FIG. 5 shows two drive actuators 104, specifically foot pedal 106 and reversing switch 112, but any operable number and/or combination of drive actuators discussed herein are within the scope of the present disclosure.

Handheld charge indicator assembly 140 includes an electronic circuit 152 or other suitable structure that is adapted to assess the input voltage 154 to the handheld charge indicator assembly and/or to the electronic circuit thereof, and an indicator 156 adapted to provide an output 158 that is representative of input voltage 154. In some embodiments, the indicator may be described as being electrically coupled to the electronic circuit and configured to output an output signal representative of the input voltage when the indicator is activated by the electronic circuit.

In some embodiments, the indicator may include a visual indicator disposed on the body of the handheld charge indicator assembly, visible to the user, and configured to display an output representative of the input voltage when the indicator is activated by the electronic circuit. In some embodiments, the indicator may be configured to output a plurality of outputs, with each output representative of a discrete range of the input voltage.

As an illustrative, non-exclusive example, output 158 of indicator 156 may be a visual display representative of input voltage 154. For example, indicator 156 may include at least one light emitting diode (LED). In some such embodiments, the indicator may include a series, or plurality, of LEDs (or other suitable lights or visual indicators) that illuminate at specific, or predetermined, threshold input voltages, a needle that is displaced on a dial responsive to the input voltage, a grouping of 7-segment LED display devices, etc. Stated differently, the electronic circuit of the handheld charge indicator assembly may be configured to illuminate each of a plurality of light emitting diodes at a specific threshold input voltage. When LEDs are used, any suitable type, quantity and/or number of LEDs may be used. In some embodiments, it may be desirable to use "super bright" LEDs so that the illumination state of the LEDs are more readily visible in outdoor or other sunlit environments. It is also within the scope of the present disclosure that indicator 156 may include one or more light emitting devices other than LEDs and/or may include a display upon which a numeric, graphic, colored, or other visual output indicative of the input voltage to indicator 156 and thus the relative state of charge of the battery, or battery assembly, from which the input voltage is detected.

Output 158 of indicator 156 may additionally or alternatively include an audible indicator configured to emit an audible output when the indicator is activated by the electronic circuit. As an illustrative, non-exclusive example, indicator 156 may be configured to output an audible tone that changes pitch or a rhythmic beat that changes frequency to reflect levels of input voltage 154. Other audible outputs and/or configurations are also within the scope of the present disclosure.

Figure 6:
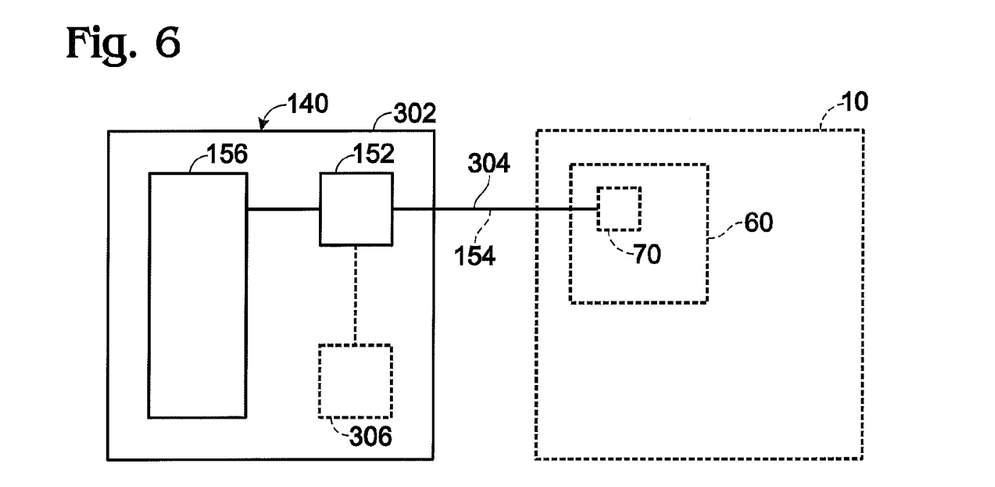
FIG. 6 is a schematic diagram of illustrative, non-exclusive examples of handheld charge indicator assemblies according to the present disclosure, schematically shown together with a children's ride-on vehicle.

FIG. 6 schematically illustrates handheld charge indicator assemblies 140 according to the present disclosure, together with a children's ride-on vehicle 10. When provided together, the combination of a handheld charge indicator assembly and a children's ride-on vehicle may be described as a children's ride-on vehicle kit and/or as a children's ride-on vehicle assembly, for example, when the handheld charge indicator assembly is selectively coupled to the battery assembly of the children's ride-on vehicle.

Handheld charge indicator assemblies 140 include a body 302 sized to be held in (i.e., grasped, supported, and positioned by) a hand of a user, an electronic circuit 152 housed within body 302 and adapted to detect input voltage 154 from battery assembly 60 of a children's ride-on vehicle 10, indicator 156, and a battery connector 304 electrically coupled to the electronic circuit and configured to engage battery assembly 60, for example, to engage a socket 70 of a battery assembly. Handheld charge indicator assemblies 140 additionally may include (but are not required to include) an actuator 306 that is disposed on body 302 in a position to be engaged by a user holding the handheld charge indicator assembly. When present, the actuator is configured to actuate the electronic circuit to detect the input voltage responsive to a user engaging the actuator. Accordingly, in some embodiments, for example, without an optional actuator, a user may electrically couple the handheld charge indicator assembly to the battery assembly of a children's ride-on vehicle, and the indicator may automatically indicate the charge level of the battery assembly. Additionally or alternatively, in some embodiments, for example, with an optional actuator, a user may electrically couple the handheld charge indicator assembly to the battery assembly and, upon engaging the actuator, the indicator may indicate the charge level of the battery assembly.

Figure 7:
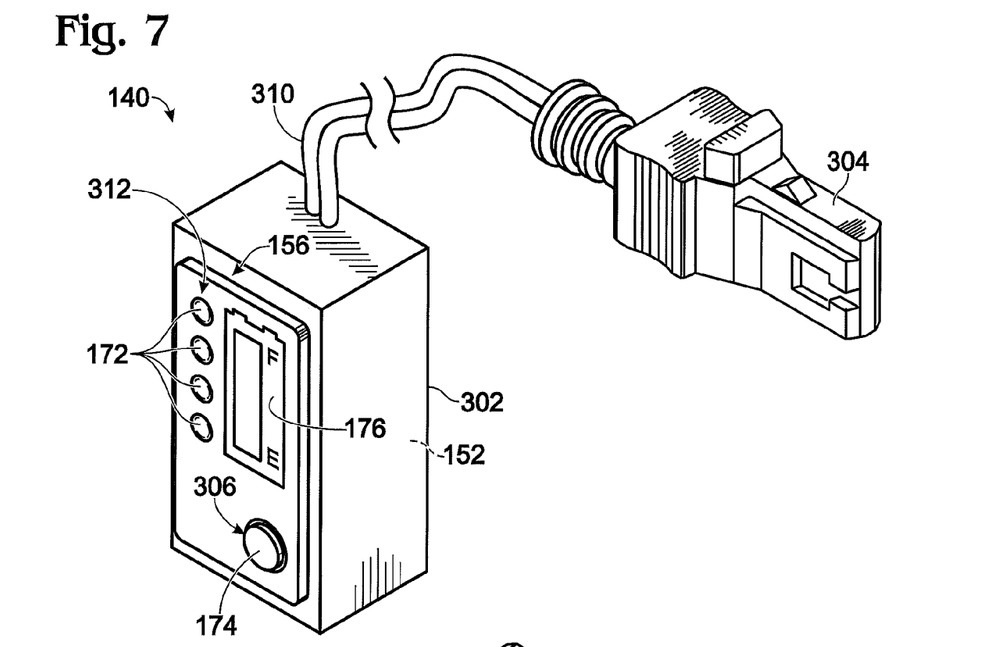
FIG. 7 is a perspective view of an illustrative, non-exclusive example of a handheld charge indicator assembly according to the present disclosure.
Figure 8:
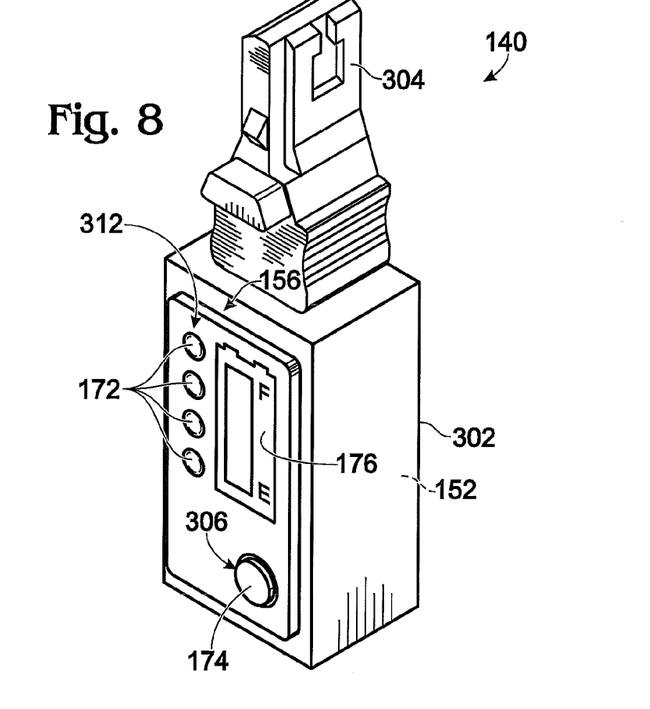
FIG. 8 is a perspective view of another illustrative, non-exclusive example of a handheld charge indicator assembly according to the present disclosure.

FIGS. 7-8 show two illustrative, non-exclusive examples of handheld charge indicator assemblies 140 according to the present disclosure. As shown, handheld charge indicator assemblies 140 include body 302 and battery connector 304. In the illustrative, non-exclusive example illustrated in FIG. 7, the assembly includes a length of wiring 310 (i.e., a suitable number of wires or other flexible electrical conductors) that terminates in the battery connector. In the illustrative, non-exclusive example illustrated in FIG. 8, the battery connector is disposed on the body of the assembly. In both illustrated examples, the battery connector may be described as extending from the body of the assembly, and further may be described as being in the form of a probe that is sized and configured to be received by a corresponding socket of a corresponding battery assembly. Other configurations are also within the scope of the present disclosure, including embodiments in which the battery connector is in the form of a socket that is configured to receive a probe, for example, that extends from a corresponding battery assembly.

As shown in FIGS. 7-8, handheld charge indicator assemblies 140 may include an indicator 156 that includes a visual display 312 that is configured to be representative of the input voltage to, or received by, the assembly, or electronic circuit thereof, from a battery assembly. In some examples, visual display 312 may include a plurality of LEDs 172, such as illustrated in the illustrative, non-exclusive examples of FIGS. 7-8. In such examples, electronic circuit 152 of handheld charge indicator assemblies 140 may be adapted to selectively actuate one or more of the plurality of LEDs to indicate the voltage, or relative voltage, of a battery assembly, or battery thereof.

As mentioned, handheld charge indicator assembly 140 may include an actuator. In the illustrative, non-exclusive examples of FIGS. 7-8, the actuator includes a button 174 that is disposed adjacent to the LEDs 172 or otherwise positioned in a suitable location for actuation by a user. When depressed, button 174 is adapted to cause handheld charge indicator assembly 140 to switch between a first state, where the output on LEDs 172 is representative of the input voltage to circuit 152, and a second state, where the output on LEDs 172 is not representative of the input voltage to circuit 152. While four LEDs 172 are shown, any suitable number of LEDs, or any other illuminating devices, or any other suitable type and/or number of indicators 156, is within the scope of the present disclosure.

Some embodiments use at least three LEDs, which may (but are not required to) comprise LEDs of at least two different colors. For example, at least one LED may indicate an uncharged and/or low charge configuration, at least one LED may indicate a fully charged configuration, and at least one LED may indicate an intermediate charge configuration between the fully charged and low/uncharged configuration. The relative states of charge are determined by the handheld charge indicator assembly responsive to the detected input voltage, such as by illuminating one or more LEDs or other visual indicators responsive to which of a series of predetermined voltage ranges the input voltage falls within. Similarly, while illustrated in FIGS. 7-8 as a button, it is within the scope of the present disclosure that the actuator may be or include any suitable switch, slide, lever, contact, toggle, or other mechanism adapted to selectively switch the handheld charge indicator assembly between its first and second states. Also, as mentioned, it is within the scope of the present disclosure that a handheld charge indicator assembly not include an actuator.

Handheld charge indicator assembly 140 may be adapted to switch to the first state when actuator 306 is engaged, and to automatically switch back to the second state when actuator 306 is disengaged. It is within the scope of the present disclosure for handheld charge indicator assembly 140 to operate in the first state for a specified period of time after actuator 306 is disengaged before switching back to operate in the second state. For example, handheld charge indicator assembly 140 may be adapted to remain in the first state for at least two seconds, at least five seconds, or longer, after actuator 306 is disengaged.

Additionally or alternatively, in embodiments in which no actuator is present, the handheld charge indicator assembly may be adapted to switch to the first state when the battery connector 304 is coupled, or interconnected, to the corresponding electrical connector of the corresponding battery assembly, and to automatically switch back to the second state when the battery connector is disconnected from the corresponding electrical connector of the corresponding battery assembly.

Handheld charge indicator assembly 140 may, but is not required to, also include graphics 176 that may assist the user in understanding the meaning of the display of handheld charge indicator assembly 140. In FIGS. 7-8, graphics 176 include the letters "E" and "F," for example, as an analogy to typical automobile fuel tank gauge indications of "empty" and "full." It is within the scope of the present disclosure that other suitable graphics may be used, such as other textual indicators and/or pictorial indicators. Accordingly, as one or more of the LEDs or other indicators are illuminated or otherwise activated, the relative range of charge states defined by the display (e.g., the position of the illuminated LED(s) along this range) provides a visual indication of the relative state of charge of the battery assembly.

Figure 9:
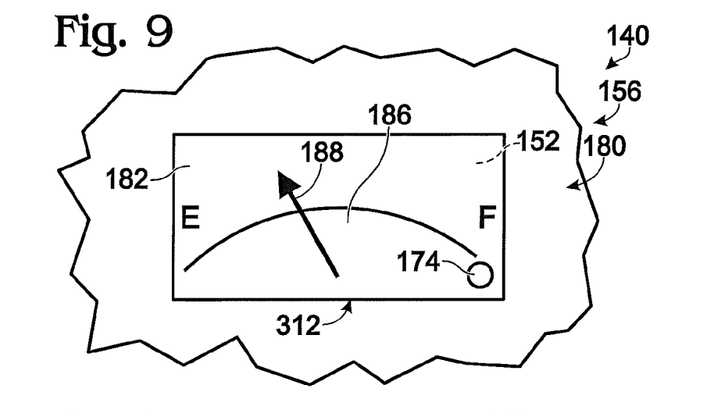
FIG. 9 is a fragmentary view of another illustrative, non-exclusive example of a handheld charge indicator assembly according to the present disclosure.

FIG. 9 shows at 180 another illustrative, non-exclusive example of a suitable indicator 156 of a handheld charge indicator assembly 140 according to the present disclosure. Indicator 180 includes a visual display 312 having a dial 186 and a needle 188. When an optional button 174 is depressed, needle 188 may move to a location on dial 186 that is representative of the input voltage, as assessed by electronic circuit 152.

Figure 10:
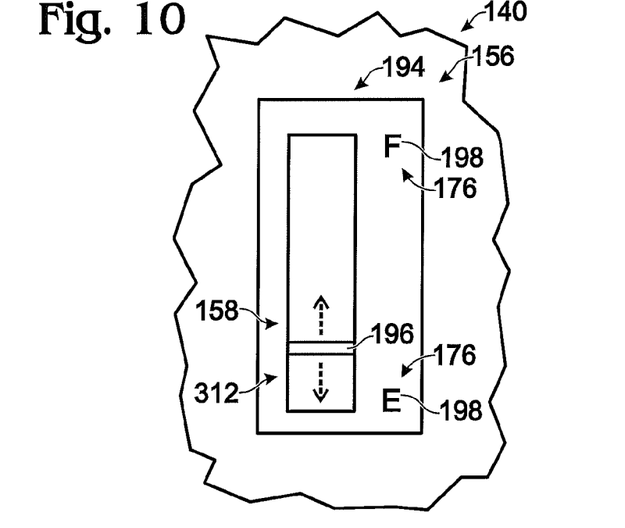
FIG. 10 is a fragmentary view of another illustrative, non-exclusive example of a handheld charge indicator assembly according to the present disclosure.
Figure 11:
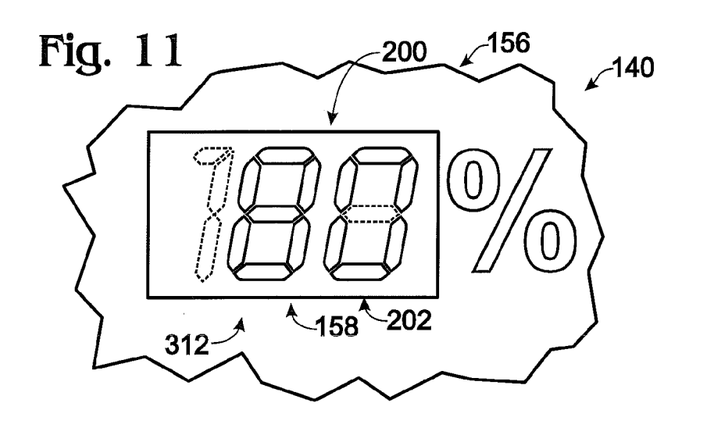
FIG. 11 is a fragmentary view of another illustrative, non-exclusive example of a handheld charge indicator assembly according to the present disclosure.

Additional illustrative, non-exclusive examples of indicators 156 of handheld charge indicator assemblies 140 according to the present disclosure are shown in FIGS. 10-11 at 194 and 200, respectively. In FIG. 10, a visual display 312 is shown in the form of an illuminable range, along which an output 158, such as an indicator 196, may be illuminated to represent the relative state of charge of the corresponding ride-on's battery assembly. Also shown at 198 in FIG. 10 are graphics 176 that respectively indicate the upper and lower thresholds of the range of relative charge of the battery assembly. In FIG. 11, a visual display 312 in the form of a numerical display 202 is shown in which an output 158 in the form of an illuminated number may be displayed to indicate the relative state of charge of the battery assembly.

Figure 12:
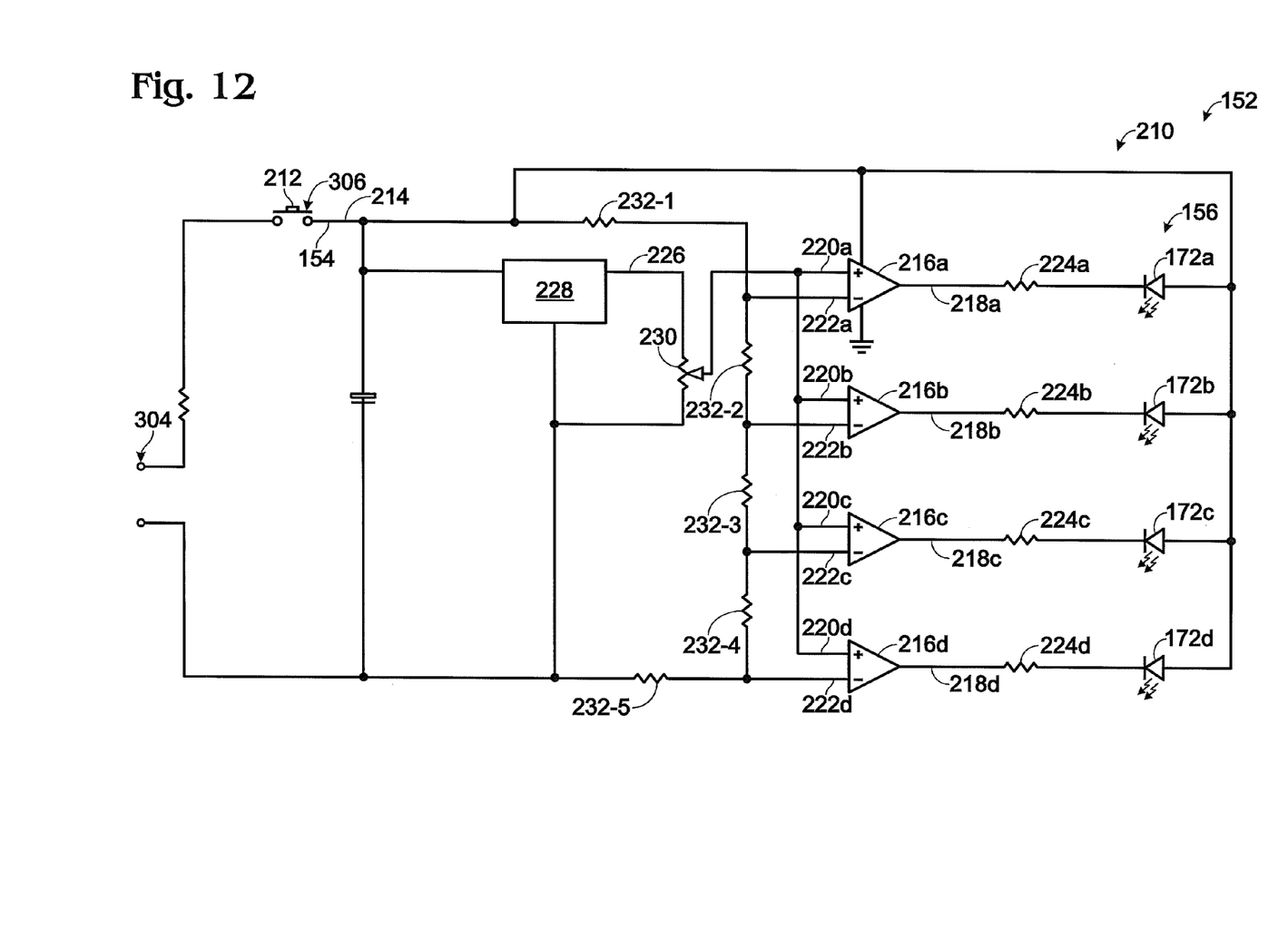
FIG. 12 is a schematic diagram of an illustrative, non-exclusive example of an electronic circuit of a handheld charge indicator assembly according to the present disclosure.

An illustrative, non-exclusive example of an electronic circuit 152 according to the present disclosure is schematically illustrated in FIG. 12, and indicated generally at 210. As shown, electronic circuit 210 includes a switch 212, which corresponds to an optional actuator 306. Switch 212 is adapted to energize circuit 210 to illuminate one or more LEDs 172, or to otherwise activate an indicator 156 according to the present disclosure, depending on the input voltage received via battery connector 304, which is schematically indicated at 214. Circuit 210, as shown, includes four operation amplifiers, or op-amps, 216, which correspond to the four LEDs 172. As discussed, the number of LEDs, and correspondingly the number of op-amps, may vary within the scope of the present disclosure, such as to include a greater or lesser number of one or more of these structures. Typically, each op-amp will be associated with at least one LED, with the op-amp and corresponding circuit components defining a threshold voltage against which the input voltage is compared, and above which, or optionally below which, the corresponding LED will be illuminated. The output 218 of an op-amp is proportional to the difference in voltage between positive input 220 and negative input 222. As shown in FIG. 12, the outputs 218 of op-amps 216 will be ground, or 0 volts, if the voltage of positive inputs 220 are less than the voltage of negative inputs 222. Conversely, outputs 218 will represent the circuit input 214 if the voltage of positive inputs 220 is greater than the voltage of negative inputs 222.

In circuit 210 as shown, LEDs 172 are in a "normally illuminated" state, and will turn off if the voltage potential of outputs 218 of op-amps 216 is driven to the circuit input voltage 214 by op-amp 216. Circuit 210 may include resistors 224 in order to control the current through LEDs 172. Accordingly, the resistance of each resistor 224 will be determined by the expected magnitude of input voltage 214, which will generally reflect the terminal voltage of a corresponding battery assembly, and the current carrying capacity of each LED 172. It is within the scope of the present disclosure that the number of resistors and individual resistance thereof may vary without departing from the scope of the present disclosure.

As shown in FIG. 12, positive inputs 220 are a potential reference, or reference potential, that are determined by the output 226 of voltage regulator 228 and the settings of variable resistor 230. Also shown in FIG. 12, negative inputs 222 correspond to a signal determined by circuit input 214 and the several voltage dividers formed by the resistors 232. For a typical positive input voltage 220, negative inputs 222 will carry a sequence of decreasing potentials with negative input 222*a* carrying the highest potential, and negative input 222*d* carrying the lowest. Op-amps 216 will then turn off LEDs 172 at a decreasing sequence of threshold voltages of negative inputs 222, with negative input 222*a* carrying the lowest threshold and negative input 222*d* carrying the highest threshold. As discussed, the number and magnitude of the threshold voltages may vary depending upon a variety of factors, including the selected number of thresholds to be utilized, design preferences, etc. As an illustrative, non-exclusive example, when four thresholds are selected, these thresholds may correspond to the battery's rated capacity, above 80% of the battery's rated capacity, above 50% of the battery's rated capacity, and 50% or less of the battery's rated capacity. Another illustrative, non-exclusive example is 100% of capacity, 50-90% of capacity, 10-50% of capacity, and 0-10% of capacity. These exemplary sets of thresholds are for illustrative purposes only, as the number and boundaries of the thresholds may vary substantially from this example without departing from the scope of the present disclosure.

A circuit designer may choose components for voltage regulator 228 and variable resistor 230, along with resistors 232, to provide a desired reference voltage at the positive inputs 222 to determine the sequence of thresholds. Moreover, the designer may choose to use multiple individual resistors for resistors 224 and 232 in order to achieve a desired resistance value and tolerance. Specifically, for a typical 12-volt lead-acid battery, components may be chosen and set to turn off LED 172*a* at a circuit input voltage 214 of less than 11.8 volts, to turn off LED 172*b* at a circuit input voltage 214 of less than 12.1 volts, to turn off LED 172*c* at a circuit input voltage 214 of less than 12.6 volts, and to turn off LED 172*d* at a circuit input voltage 214 of less than 13.1 volts. As discussed, battery assemblies according to the present disclosure may include one or more batteries and these batteries may have rated voltages other than 12 volts, such as 6 volts, 18 volts, 24 volts, etc. It is within the scope of the present disclosure to utilize handheld charge indicator assemblies 140 according to the present disclosure with these batteries as well, with corresponding voltage thresholds.

Other embodiments of circuit 152 may light each LED 172 in a specific range of circuit input voltage 214. The specific ranges of circuit input voltage may overlap such that multiple LEDs 172 may be illuminated simultaneously, or ranges may be discrete such that one LED 172 may be illuminated at a time. Other embodiments of circuit 152 may drive other indicators that may show a continuously varying output representative of input voltage 214, such as the needle and dial display of FIG. 9, or an audible indicator.

The following enumerated paragraphs represent illustrative, non-exclusive ways of describing inventions according to the present disclosure. Other ways of describing inventions according to the present disclosure are also within the scope of the present disclosure.

A1 A handheld charge indicator assembly for use with a children's ride-on vehicle having a battery assembly, the handheld charge indicator assembly comprising:
 a body sized to be held in a hand of a user;
 an electronic circuit housed within the body and adapted to detect an input voltage to the electronic circuit from the battery assembly of the children's ride-on vehicle;
 an indicator electrically coupled to the electronic circuit and configured to output an output signal representative of the input voltage when the indicator is activated by the electronic circuit; and
 a battery connector electrically coupled to the electronic circuit and configured to engage the battery assembly of the children's ride-on vehicle and to establish an electrical connection between the battery assembly and the electronic circuit.

A2 The handheld charge indicator assembly of paragraph A1, further comprising:
 an actuator disposed on the body in a position to be engaged by a user holding the handheld charge indicator assembly, the actuator configured to actuate the electronic circuit to detect the input voltage responsive to a user engaging the actuator.

A3 The handheld charge indicator assembly of paragraph A2, wherein the actuator includes a button.

A4 The handheld charge indicator assembly of paragraph A1, wherein the electronic circuit is adapted to activate the indicator upon the battery connector being engaged with the battery assembly of the children's ride-on vehicle.

A5 The handheld charge indicator assembly of any of paragraphs A1-A4, wherein the battery connector is disposed on the body.

A6 The handheld charge indicator assembly of any of paragraphs A1-A4, wherein the battery connector extends from the body.

A7 The handheld charge indicator assembly of any of paragraphs A1-A4, further comprising:
 a length of wiring extending from the body and terminating in the battery connector.

A8 The handheld charge indicator assembly of any of paragraphs A1-A7, wherein the indicator includes an audible indicator configured to emit an audible output when the indicator is activated by the electronic circuit.

A9 The handheld charge indicator assembly of any of paragraphs A1-A8, wherein the indicator includes a visual indicator disposed on the body, visible to the user, and configured to display an output representative of the input voltage when the indicator is activated by the electronic circuit.

A10 The handheld charge indicator assembly of any of paragraphs A1-A9, wherein the indicator is configured to output a plurality of outputs, each output representative of a discrete range of the input voltage.

A11 The handheld charge indicator assembly of any of paragraphs A1-A10, wherein the indicator includes at least one light emitting diode.

A12 The handled charge indicator assembly of any of paragraphs A1A11, wherein the indicator includes a plurality of light emitting diodes, and wherein the electronic circuit is configured to illuminate each of the plurality of light emitting diodes at a specific threshold input voltage.

A13 The handheld charge indicator of any of paragraphs A1-A12, wherein the battery connector is sized to be received into a socket of the battery assembly.

A14 The handheld charge indicator assembly of any of paragraphs A1-A13, in combination with the children's ride-on vehicle having the battery assembly and including an electric motor and a driven wheel coupled to the electric motor, wherein the battery assembly is configured to selectively energize the electric motor to drive rotation of the driven wheel.

A15 The handheld charge indicator assembly and children's ride-on vehicle of paragraph A14, wherein the battery assembly includes an electrical connector configured to be selectively interconnected with the battery connector of the handheld charge indicator.

A16 The handheld charge indicator assembly and children's ride-on vehicle of paragraph A15, wherein the electrical connector is further configured to be selectively interconnected with the electric motor.

A17 The handheld charge indicator assembly and children's ride-on vehicle of paragraph A14, wherein the battery assembly includes:
an indicator connector configured to be selectively interconnected with the battery connector of the handheld charge indicator assembly; and
a motor connector configured to be selectively interconnected with the electric motor.

A18 A children's ride-on vehicle kit, comprising:
a children's ride-on vehicle including:
a body including a seat sized for a child;
a plurality of wheels rotatably coupled to the body, wherein the plurality of wheels includes a steerable wheel and a driven wheel;
a steering assembly including a steering mechanism adapted to receive steering inputs from a child sitting on the seat, and a steering linkage configured to convey the steering inputs to the steerable wheel; and
a drive assembly configured to selectively drive rotation of the driven wheel, the drive assembly including:
an electric motor;
a user input device positioned to receive inputs from a child sitting on the seat and configured to actuate the electric motor; and
a battery assembly configured to selectively energize the electric motor, the battery assembly including a rechargeable battery; and
a handheld charge indicator assembly of any of paragraphs A1-A13.

A19 The children's ride-on vehicle kit of paragraph A18, wherein the battery assembly includes an electrical connector configured to be selectively interconnected with the battery connector of the handheld charge indicator assembly.

A20 The children's ride-on vehicle kit of paragraph A19, wherein the electrical connector is further configured to be selectively interconnected with the electric motor.

A21 The children's ride-on vehicle kit of paragraph A18, wherein the battery assembly includes:
an indicator connector configured to be selectively interconnected with the battery connector of the handheld charge indicator assembly; and
a motor connector configured to be selectively interconnected with the electric motor.

A22 A method of determining the state of charge of a battery assembly of a children's ride-on vehicle, the method comprising:
providing the handheld charge indicator assembly of any of paragraphs A1-A12; and
interconnecting the battery connector with the battery assembly of the children's ride-on vehicle.

A23 The method of paragraph A22, wherein the children's ride-on vehicle includes an electric motor and the battery assembly includes an electrical connector configured to be selectively interconnected with the electric motor, the method further comprising:
prior to the interconnecting, disconnecting the electric motor from the electrical connector of the battery assembly;
wherein the interconnecting includes interconnecting the battery connector with the electrical connector of the battery assembly.

B1 A handheld charge indicator assembly for use with a children's ride-on vehicle having a battery assembly, the handheld charge indicator assembly comprising:
a body sized to be held in a hand of a user;
a plurality of light emitting diodes disposed on the body and visible to the user;
a button disposed on the body in a position to be engaged by a user holding the handheld charge indicator assembly;
an electronic circuit housed within the body and adapted to detect an input voltage to the electronic circuit from the battery assembly of the children's ride-on vehicle, wherein the electronic circuit is configured to illuminate each of the plurality of light emitting diodes at a specific threshold input voltage responsive to a user engaging the button; and
a battery connector extending from the body, the battery connector electrically coupled to the electronic circuit and configured to engage the battery assembly of the children's ride-on vehicle and to establish an electrical connection between the battery assembly and the electronic circuit.

C1 A method of determining the state of charge of a battery assembly of a children's ride-on vehicle having an electric motor, the method comprising:
interconnecting a battery connector of a handheld charge indicator assembly with an electrical connector of the battery assembly of the children's ride-on vehicle.

C2 The method of paragraph C1, further comprising:
prior to the interconnecting, disconnecting the electric motor from the electrical connector of the battery assembly.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

INDUSTRIAL APPLICABILITY

The present disclosure is applicable to battery-powered children's ride-on vehicles with battery-powered motor assemblies.

The invention claimed is:

1. A handheld charge indicator assembly for use with a children's ride-on vehicle having a driven wheel, an electric motor adapted to drive rotation of the driven wheel, a battery assembly including a socket and configured to selectively energize the electric motor to drive rotation of the driven wheel, an electrical cable for transmission of electrical power from the battery assembly to the electric motor, and a plug connected to the electrical cable, wherein the socket is configured to selectively receive the plug, the handheld charge indicator assembly comprising:
 a body sized to be held in a hand of a user;
 an electronic circuit housed within the body and adapted to detect an input voltage to the electronic circuit from the battery assembly of the children's ride-on vehicle;
 an indicator electrically coupled to the electronic circuit and configured to output an output signal representative of the input voltage when the indicator is activated by the electronic circuit; and
 a battery connector electrically coupled to the electronic circuit and configured to selectively and directly engage the socket of the battery assembly of the children's ride-on vehicle only when the plug is not received by the socket and to establish an electrical connection between the battery assembly and the electronic circuit.

2. The handheld charge indicator assembly of claim 1, further comprising:
 an actuator disposed on the body in a position to be engaged by a user holding the handheld charge indicator assembly, the actuator configured to actuate the electronic circuit to detect the input voltage responsive to a user engaging the actuator.

3. The handheld charge indicator assembly of claim 1, wherein the electronic circuit is adapted to detect the input voltage and the indicator is configured to output the output signal upon the battery connector being engaged with the battery assembly of the children's ride-on vehicle.

4. The handheld charge indicator assembly of claim 1, wherein the battery connector extends directly from the body.

5. The handheld charge indicator assembly of claim 1, wherein the indicator includes an audible indicator configured to emit an audible output when the indicator is activated by the electronic circuit.

6. The handheld charge indicator assembly of claim 1, wherein the indicator includes a visual indicator disposed on the body, visible to the user, and configured to display an output representative of the input voltage when the indicator is activated by the electronic circuit.

7. The handheld charge indicator assembly of claim 1, wherein the indicator is configured to output a plurality of outputs, each output representative of a discrete range of the input voltage.

8. The handheld charge indicator assembly of claim 1, wherein the indicator includes at least one light emitting diode.

9. The handheld charge indicator assembly of claim 1, wherein the indicator includes a plurality of light emitting diodes, and wherein the electronic circuit is configured to illuminate each of the plurality of light emitting diodes at a specific threshold input voltage.

10. The handheld charge indicator assembly of claim 1, in combination with the children's ride-on vehicle.

11. A children's ride-on vehicle kit, comprising:
 the handheld charge indicator assembly of claim 1;
 a children's ride-on vehicle including:
  a body including a seat sized for a child;
  a plurality of wheels rotatably coupled to the body, wherein the plurality of wheels includes a steerable wheel and a driven wheel;
  a steering assembly including a steering mechanism adapted to receive steering inputs from a child sitting on the seat, and a steering linkage configured to convey the steering inputs to the steerable wheel; and
  a drive assembly configured to selectively drive rotation of the driven wheel, the drive assembly including:
   an electric motor;
   a user input device positioned to receive inputs from a child sitting on the seat and configured to actuate the electric motor;
   a battery assembly configured to selectively energize the electric motor;
   an electrical cable for transmission of electrical power from the battery assembly to the electric motor; and
   a plug connected to the electrical cable;
  wherein the battery assembly includes:
   a housing;
   a rechargeable battery supported by the housing; and
   a socket supported by the housing, wherein the socket is configured to selectively receive the plug for interconnection of the battery assembly and the electric motor, and wherein the socket is configured to selectively receive only one of the plug and the battery connector at a time.

12. The children's ride-on vehicle kit of claim 11, wherein the socket includes:
 an indicator connector configured to be selectively interconnected with the battery connector of the handheld charge indicator assembly; and
 a motor connector configured to be selectively interconnected with the plug.

13. A method of determining the state of charge of a battery assembly of a children's ride-on vehicle, the method comprising:
 providing the handheld charge indicator assembly of claim 1; and
 interconnecting the battery connector with the battery assembly of the children's ride-on vehicle.

14. The method of claim 13, further comprising:
 prior to the interconnecting, disconnecting the plug from the socket.

15. A handheld charge indicator assembly for use with a children's ride-on vehicle having a motor assembly adapted to drive rotation of a driven wheel, a battery assembly including a motor connector and an indicator connector, wherein the motor connector is configured to selectively interconnect the battery assembly to the motor assembly, and wherein the indicator connector is configured to selectively interconnect the battery assembly to the handheld charge indicator assembly, the handheld charge indicator assembly comprising:

a body sized to be held in a hand of a user;

an electronic circuit housed within the body and adapted to detect an input voltage to the electronic circuit from the battery assembly of the children's ride-on vehicle;

an indicator electrically coupled to the electronic circuit and configured to output an output signal representative of the input voltage when the indicator is activated by the electronic circuit; and     a battery connector electrically coupled to the electronic circuit and configured to selectively and directly engage the indicator connector of the battery assembly of the children's ride-on vehicle and to establish an electrical connection between the battery assembly and the electronic circuit.

16. The handheld charge indicator assembly of claim 15, wherein the indicator connector is configured to receive the battery connector only when the motor connector is not interconnecting the battery assembly to the motor assembly.

17. The handheld charge indicator assembly of claim 15, wherein the indicator connector is configured to receive the battery connector while the motor connector interconnects the battery assembly to the motor assembly.

18. The handheld charge indicator assembly of claim 15 in combination with the children's ride-on vehicle.

19. The handheld charge indicator assembly of claim 15, wherein the battery connector extends directly from the body.

\* \* \* \* \*